United States Patent
Sartirana et al.

(10) Patent No.: US 9,075,820 B2
(45) Date of Patent: Jul. 7, 2015

(54) DISTRIBUTED FILE SYSTEM AT NETWORK SWITCH

(75) Inventors: Bruno Sartirana, Roseville, CA (US); Giuseppe Scaglione, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/562,050

(22) Filed: Jul. 30, 2012

(65) Prior Publication Data

US 2014/0032940 A1 Jan. 30, 2014

(51) Int. Cl.
G06F 13/12 (2006.01)
G06F 15/16 (2006.01)
G06F 17/30 (2006.01)
H04L 29/08 (2006.01)

(52) U.S. Cl.
CPC ....... G06F 17/30203 (2013.01); H04L 67/1097 (2013.01)

(58) Field of Classification Search
CPC . G06F 17/30194; G06F 3/067; G06F 17/302; H04L 69/14
See application file for complete search history.

(56) References Cited

U.S. PATENT DOCUMENTS

| 6,996,458 | B2 | 2/2006 | Pincu et al. | |
|---|---|---|---|---|
| 2001/0038635 | A1 | 11/2001 | Rogers | |
| 2002/0120763 | A1* | 8/2002 | Miloushev et al. | 709/230 |
| 2003/0135511 | A1* | 7/2003 | Anderson et al. | 707/101 |
| 2005/0262102 | A1* | 11/2005 | Anderson et al. | 707/10 |
| 2007/0214105 | A1 | 9/2007 | Sfarti et al. | |
| 2008/0092186 | A1* | 4/2008 | Briski et al. | 725/110 |

FOREIGN PATENT DOCUMENTS

| CN | 101764729 | 6/2010 |
|---|---|---|
| WO | WO-2011138581 | 11/2011 |

OTHER PUBLICATIONS

What is hypervisor, Apr. 5, 2014, Webopedia.*
Dell Powerconnect W-600 Controller Series, (Research Paper).

* cited by examiner

*Primary Examiner* — Hyun Nam
(74) *Attorney, Agent, or Firm* — Hewlett-Packard Legal Dept.

(57) ABSTRACT

Embodiments herein relate to running a distributed file system on a network switch. The distributed file system is to manage access to a plurality of storage drives that store data and are connected to the network switch.

13 Claims, 4 Drawing Sheets

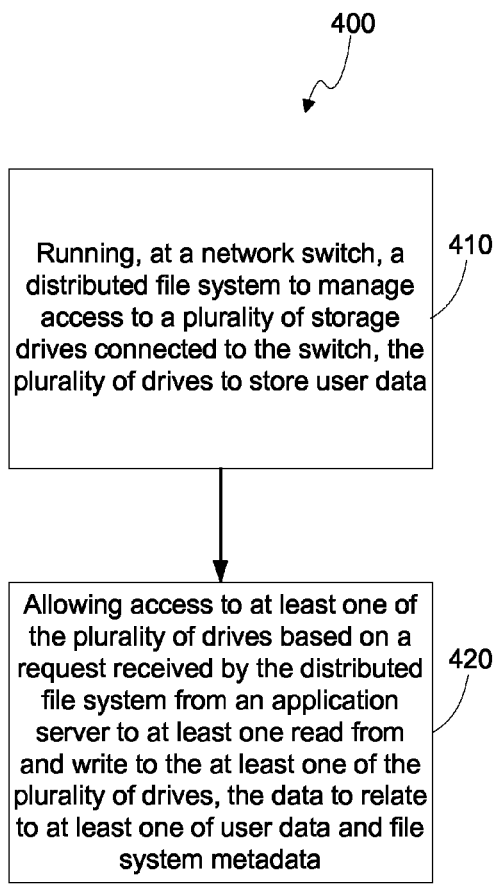
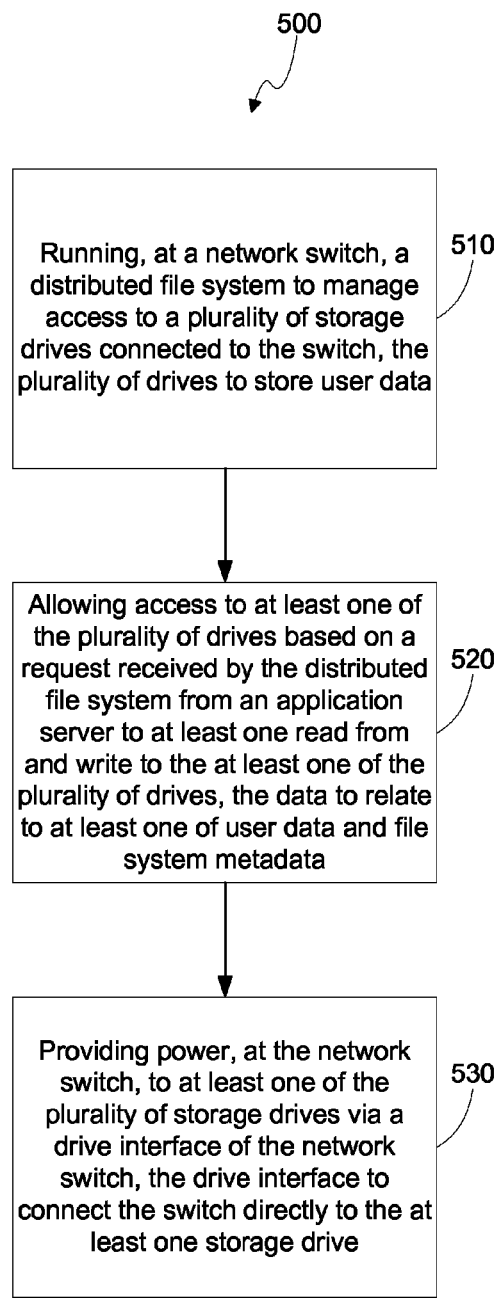

DISTRIBUTED FILE SYSTEM AT NETWORK SWITCH

BACKGROUND

With the advent of cloud computing, service providers face increasing storage needs to store information, such as text, pictures, videos, music, emails services, PC backup services, etc. Further, service providers require data resiliency and fast access on a continuously larger scale as the cloud grows. Service providers may add file servers, such as commodity or NetApp servers, with multiple hard drives to increase storage capacity while maintaining sufficient redundancy to reach the desired level of availability and integrity.

Typically, clouds that use many file servers for storage, e.g. storage farms, require truly distributed file systems that abstract file locations and volumes, presenting a single hierarchical name space with virtually-unlimited capacity to applications. A server-side of the distributed file systems is generally stored and executed at the file servers.

BRIEF DESCRIPTION OF THE DRAWINGS

The following detailed description references the drawings, wherein:

FIG. 4 is an example flowchart of a method for running a distributed file system on a network switch; and FIG. 5 is another example flowchart of a method for running a distributed file system on a network switch.

DETAILED DESCRIPTION

Figure 1:
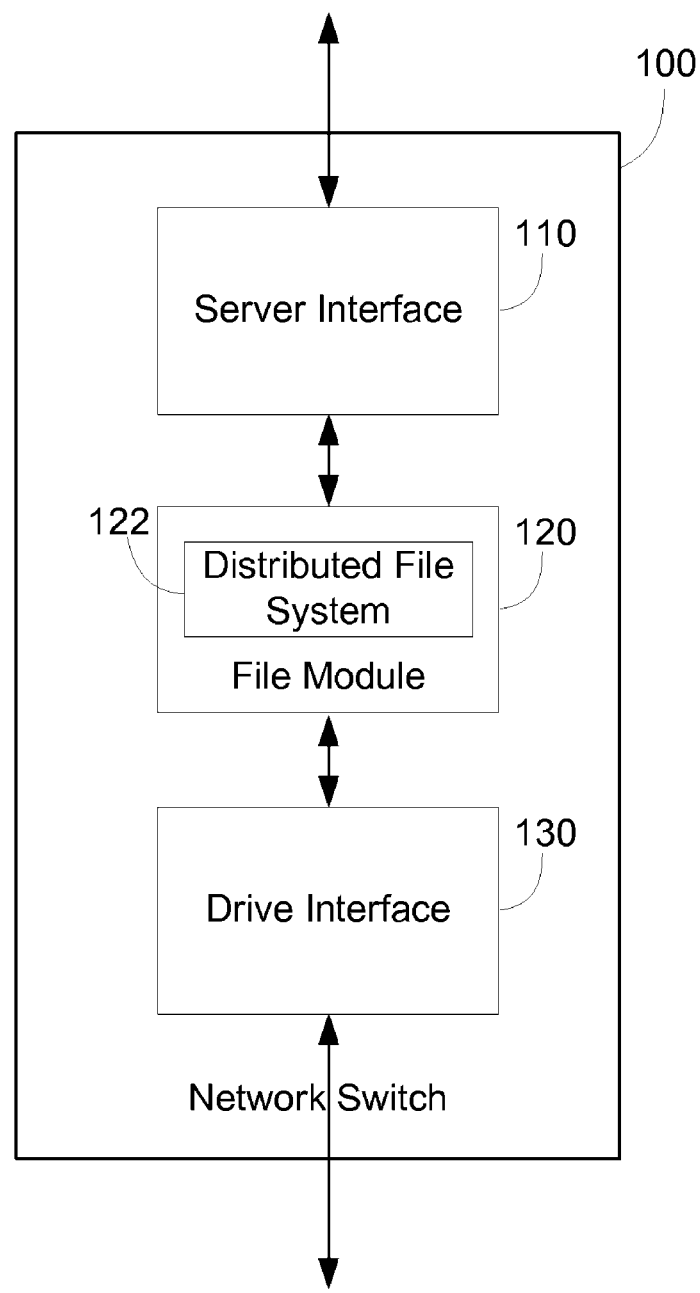
FIG. 1 is an example block diagram of a network switch.

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Service providers, such as web or cloud companies, often store data in large storage networks. These storage networks usually employ file servers, such as commodity servers, to store the data. Commodity servers may be entry-level or affordable servers employed for basic tasks, such as file serving and cloud computing. Thus, in addition to having storage drives, commodity servers may also include a power supply and a processor for running software, such as a Windows-based or Linux operating system as well as a distributed file system.

The distributed file system may abstract volume/file locations from a plurality of file servers by presenting a single hierarchical name space to an application. Further, the distributed file system may seamlessly accommodate for an increase in capacity, without disruption to applications, maintain a balanced distribution of files across all file servers to avoid access bottlenecks, and implement both data and metadata redundancy to avoid permanent losses and further distribute the load.

A cost of a commodity server, for example, that implements a distributed file system and include 8 terabytes (TB) of capacity may be $2000 to $3000. The service provider may initially buy thousands of such commodity servers and then continue to buy additional such commodity servers in the future as storage needs increase. Thus, any reduction in costs that can be achieved per unit of storage capacity, such as per file server, may become significant.

Embodiments herein relate to operating a distributed file system at a network switch, instead of at a file server. For example, the network switch may include a server interface, a drive interface and a file module. The server interface is to interface with an application server that is to store an application. The drive interface is to interface with a storage drive that is to store data. The file module is to interface with the server and drive interface. Further, the file module includes a distributed file system to manage access to the storage drive via the server interface. Thus, embodiments, may replace commodity servers with lower cost storage drives while employing a slightly more costly network switch that performs file services in addition to its traditional duties, which may result in relatively great storage cost reductions.

For example, typical network switches that support up to 48 1 Gb/s Ethernet ports may include a single core CPU and a relatively small amount of RAM. In one embodiment, in order to have the network switch run a server-side of a distributed file system, the network switch may include additional processing power and RAM. For instance, the network switch may include a processor, such as a relatively inexpensive multi-core ARM processor, and a relatively inexpensive amount of RAM, such as 2 to 4 gigabytes (GB). As a result, the storage drives connecting to the network switch may be simple, low-power storage devices, such as 2 terabyte (TB) hard or solid state drive that consumes less than 20 Watts. Thus, embodiments may allow for overall lower power consumption and less heat being generated, which may also lower cooling costs.

Further, an embodiment of the network switch may include an Ethernet port for supporting data as well as power, e.g. Power-over-Ethernet (PoE) to the storage drives. By directly powering the storage drives, the network switch may further reduce costs by removing a need for a power supply at the storage drives. In addition, an Ethernet connection to the storage devices may allow for higher data transfer speeds compared to traditional ATA connections. In another embodiment, the network switch may include a hypervisor to run a plurality of operating systems, such as Linux in parallel with a non-Linux system, in order to interface with devices having different operating systems.

In embodiments, by moving the distributed file system to the network switch and thereby removing a need for an off-board processor and/or a power supply at the storage devices, the smaller storage devices may occupy less space, consume less power, cost less, and generate less heat than traditional file servers, such as commodity servers. For example, embodiments may reduce storage costs by replacing traditional systems having single-core network switches and commodity servers that cost $2000 to $3000 with low-cost multi-core switches and storage drives costing less than $500.

Referring now to the drawings, FIG. 1 is an example block diagram of a network switch 100. The network switch 100 may be any type of device to connect network segments or network devices. For example, the term network switch may also include computer networking devices such as a hub, router, bridge, gateway, multilayer switch and the like.

In the embodiment of FIG. 1, the network switch 100 includes a server interface 110, a file module 120 and a drive interface 130. The server interface 110, file module 120 and drive interface 130 may include, for example, a hardware device including electronic circuitry for implementing the functionality described below, such as control logic and/or memory. In addition or as an alternative, the resource and interface modules 110 and 120 may be implemented as a series of instructions encoded on a machine-readable storage medium and executable by a processor.

The server and drive interfaces 110 and 130 may include mechanical, electrical and/or logical signals and a protocol for sequencing the signals. The server interface 110 is to interface, such as via a LAN or WAN connection, with an application server (not shown) that is to store an application. The drive interface 130 is to interface, such as via an Ethernet connection, with a storage drive (not shown) that is to store data, such as user data and file system metadata. For example, the server interface 110 may include a port (not shown) to connect to the application server and the drive interface 130 may include one or more ports (not shown) to connect with one or more storage drives. The application server and storage drive will be explained in greater detail with respect to FIG. 2.

The file module 120 is to interface with the server and drive interfaces 110 and 130. Further, the file module 120 includes a distributed file system 122 to manage access to the storage drive via the server interface 110. The distributed file system 122 may be any type of file system that allows access to files from multiple hosts sharing via a computer network. Thus, multiple users on multiple machines may share files and storage resources. Examples of the distributed file system may include Amazon S3 (S3), Google GFS (GFS), Apache Hadoop (HADOOP) and Maxiscale Flex (FLEX).

When the distributed file system 122 is implemented, the users or clients may not have direct access to the underlying block storage but may interact over the network using a protocol, such as NFS, 9P, CIFS and the like. For example, the users may interact with the application server to request access to data, which may then send an NFS request to the network switch 100. The distributed file system 122 at the network switch 100, along with any related systems, such as an operating system (OS), a Network File System (NFS) client, a Virtual File Systems (VFS), may then translate the NFS request to local file system APIs, in order to access the requested data from the storage drive.

Thus, the distributed file system may control access to one or more files depending on access lists or capabilities of the application server and/or clients, depending on how the protocol is designed. For example, as shown above, users or clients may access the distributed file system 122 at the network switch 100 via one or more application servers using an NFS protocol, and the hosts may be one or more storage drives connected to the network switch 100.

Figure 2:
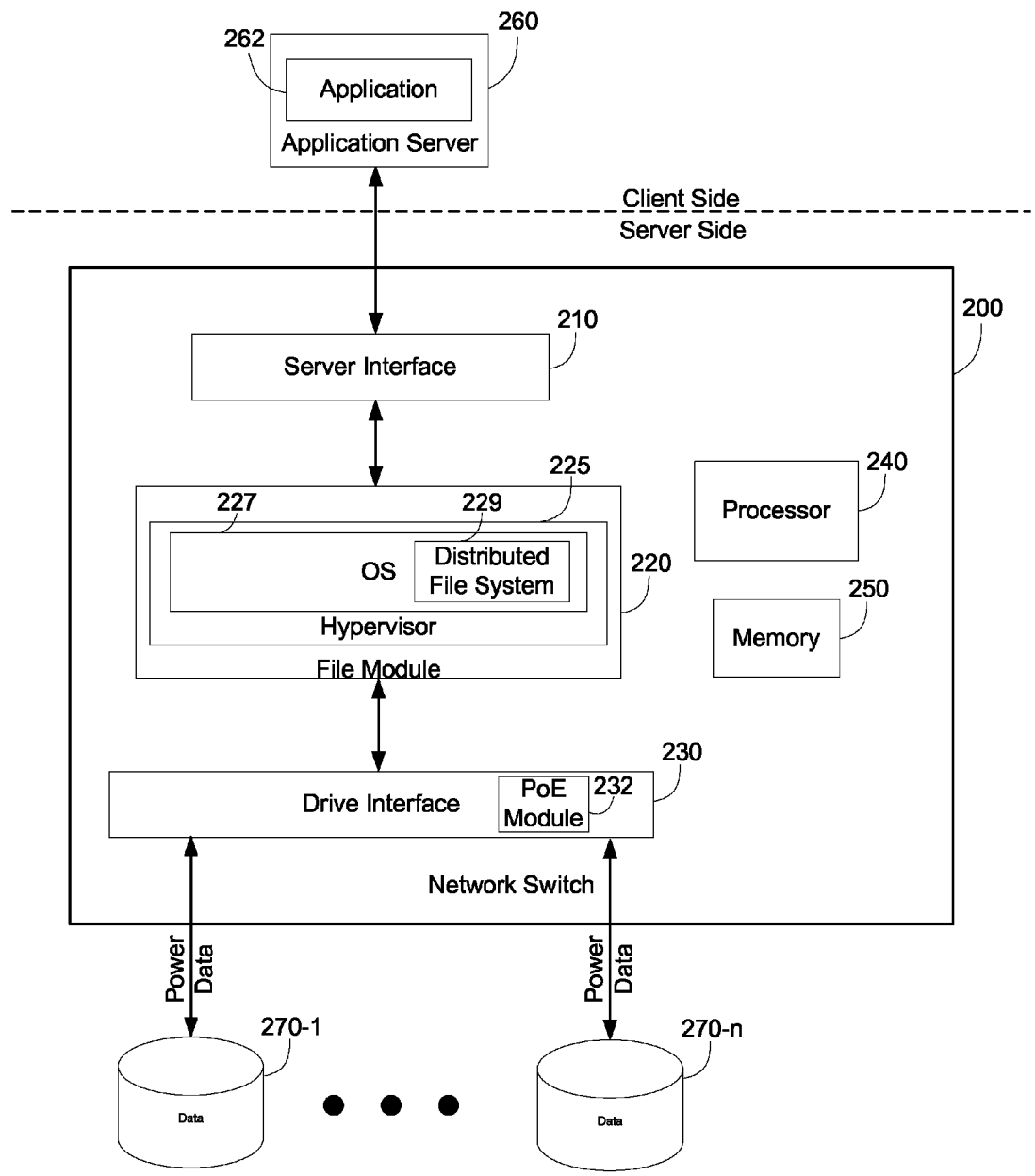
FIG. 2 is another example block diagram of a network switch interfacing with an application server and storage drives.

FIG. 2 is another example block diagram of a network switch 200 interfacing with an application server 260 and storage drives 270-1 to 270-n. The network switch 200 may be any type of device to connect network segments or network devices. For example, the term network switch may also include computer networking devices such as a hub, router, bridge, gateway, multilayer switch and the like.

In the embodiment of FIG. 2, the network switch 200 includes a server interface 210, a file module 220, a drive interface 230, a processor 240 and a memory 250. The network switch 200 further connects to an application server 260 and a plurality of storage devices 270-1 to 270-n. The server interface 210, file module 220 and drive interface 230 of FIG. 2 may at least respectively include the functionality and/or hardware of the server interface 110, file module 120 and drive interface 130 of FIG. 1.

As shown in FIG. 2, the network switch 200 is to communicate and connect directly with the application server 260 and to communicate and connect directly with the storage drives 270-1 to 270-n. Further, the network switch 200 may power at least one of the storage drives 270-1 to 270-n via the drive interface. For example, a network cable 115, such as an Ethernet cable, may connect a port (not shown) of the network switch 200 to a port (not shown) of one of the storage drives 270-1 to 270-n. When the Ethernet cable is used, the one of the storage drives 270-1 to 270-n may be referred to as the Powered Device (PD), the network switch 200 may be referred to as the Power Sourcing Equipment (PSE) and an overall scheme for providing the power from the network switch 200 to at least one of the storage drives 270-1 to 270-n may be referred to as Power over Ethernet (PoE), with a PoE module 232 of the drive interface 230 including circuitry and/or protocols for providing the power. In one example, the network switch 200 may include 48 ports (not shown) and thus be able to support up to 48 storage drives 270.

For example, the drive interface 230 and the storage drives 270-1 to 270-n may include Ethernet ports, with the drive interface 230 to provide the power to and to communicate with the storage drives 270-1 to 270-n via the Ethernet ports. Further, the drive interface 230 may communicate with the storage drives 270-1 to 270-n using an ATA over Ethernet (AoE) protocol and is to provide power to the storage drive via a PoE controller (not shown) included in the PoE module 232. However, embodiments are not limited to Ethernet cables and may include various other types of network cables for providing power and/or data to the storage drives 270-1 to 270-n.

As the distributed file system 229 and power source may be centralized at the network switch 200, the storage drives 270-1 to 270-n may not need their own power supply or an off-board processor. As a result, the storage drives 270-1 to 270-n may provide substantial cost savings and require less space compared to traditional file servers. Further, a cost of the network switch 100 or 200 that includes the distributed file system 122 or 229 may only be slightly greater than a cost of a traditional network switch. Thus, overall costs may be greatly reduced without a sacrifice in overall performance.

While the network switch 200 may have a capability to power all the connected storage drives 270-1 to 270-n, the network switch 200 may not power inactive storage drives 270. For example, some of the storage drives 270 may be allocated as spare drives that are powered down, and not powered up and activated until the distributed file system 229 requires additional capacity and/or to replace faulty storage drives 270. However, other embodiments of the network switch 200 may also altogether lack a capability to power the storage drives 270-1 to 270-n.

The file module 220 is shown to include a hypervisor 225 to host an operating system (OS) 227. Example OSs may include Windows, Linux, GHS Integrity, and the like. The hypervisor 225 may concurrently host a plurality of OSs, where the one or more OSs may be virtual machines that are managed by the hypervisor 225. The hypervisor 220 may include any type of hardware virtualization technique that allows multiple OSs to run concurrently as guests on a host device, such as the network switch 220, or the hypervisor could be an OS itself. A functionality of the hypervisor 220 may be flexible and determined according to a user's or manufacturer's specification. For example, the hypervisor 225 may launch and monitor the OS 227 and/or other OSs (not shown), such as via a process of the hypervisor 220.

In this instance, the OS 227 is shown to run the distributed file system 229. However, embodiments are not limited thereto. For example, in one embodiment, the hypervisor 225 may instead directly run the distributed file system 229 concurrently with the OS 227. Moreover, embodiments may include the hypervisor 225 hosting a plurality of OSs, with each of the OSs running a separate distributed file system. While FIG. 2 shows the file module 220 to include the hypervisor 225, embodiments may exclude the hypervisor 225 altogether, such as if file module 220 only includes a single operating system.

The network switch 200 is to connect to the plurality of storage drives 270-1 to 270-n and the distributed file system 229 is to manage access to the plurality of storage drives 270-1 to 270-n via the drive interface 230. The distributed file system 229 is to store, retrieve and update the data, and to manage available space on the storage drives 270-1 to 270-n. The network switch 229 is to present at least a portion of a single hierarchical name space to the application 262 of the application server 260. For example, in a network employing a plurality of network switches, a single network switch may only contribute a portion of the name space mapped to the storage drives 270 that the network switch 200 controls. In turn, the plurality of the network switches running the distributed file system may provide in aggregate the entire name space. On the other hand, if the network only employs a single network switch, the single network switch may provide the entire name space.

The application server 260 is to execute a client-side of the distributed file system 229 (not shown) to access the data at the storage drives 270-1 to 270-n, and the network switch 200 is to execute a server-side of the distributed file system 229. Further, the application server 260 may perform access validation and run the services invoked by the user. For example, the application server 260 may be a server that provides services such as security, data services, transaction support, load balancing, management of large distributed systems, a file application programming interface (API), a virtual file system (VFS), etc.

The application server 260 may provide the services to one or more users accessing the application server 260. While FIG. 2 shows the application server 260 to include a single application 262, the application server 260 may include a plurality of applications. Moreover, while FIG. 2 shows a single application server 260, embodiments may include a plurality of application servers connecting to the network switch 200.

The plurality of storage devices 270-1 to 270-n, where n is a natural number, may be may be any electronic, magnetic, optical, or other physical storage device that contains or stores data, such as user data, file system metadata, application server data, and the like. For example, the plurality of storage devices 270-1 to 270-n may be any combination of hard disk drives, solid-state drives, SATA drives, and the like.

The storage drives 270-1 to 270-n may include a hard drive controller board having an Application-specific integrated circuit (ASIC) (not shown) to terminate the AoE protocol as well as a PoE module (not shown) to separate a power component from the data component of the Ethernet connection. In one embodiment, at least one of the storage drives 270 may use approximately 25 Watts W to start up and approximately 10 W thereafter. Further, should any of the storage drives 270 require more power than that available from a single port of the network switch 200, the storage drive 270 may connect to more than one port of the network switch 200.

The processor 240 may be, at least one central processing unit (CPU), at least one semiconductor-based microprocessor or other hardware devices suitable for retrieval and execution of instructions. For example, the processor 240 may be a multi-core processor to fetch, decode, and execute instructions related to the hypervisor 225, the OS 227 and/or the distributed file system 229.

The memory 250 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. For example, the memory 250 may store executable code and/or data related to the hypervisor 225, the distributed file system 229, the OS 227, metadata or application data of the application server 260, and the like. While not shown, the network switch 200 may also include software, firmware and/or hardware related to a socket, socket APIs, the Ethernet protocol, file APIs, a virtual file system (VFS), a local file system, a SATA driver, the AoE protocol, the PoE protocol, and the like.

Figure 3:
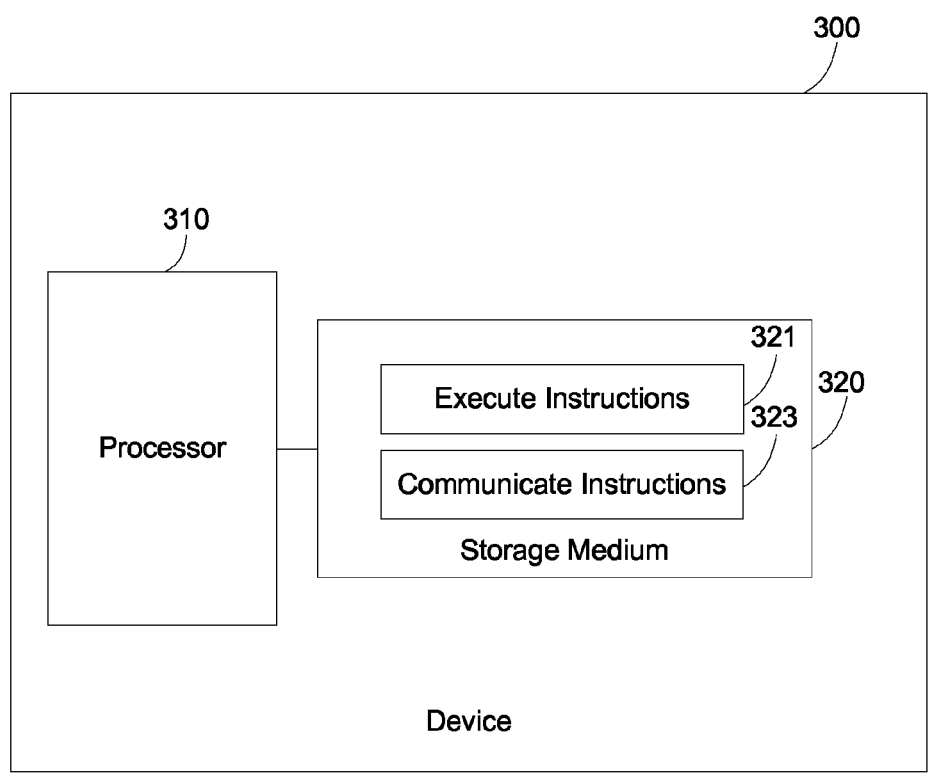
FIG. 3 is an example block diagram of a computing device including instructions for executing a distributed file system at a network switch.

FIG. 3 is an example block diagram of a computing device 300 including instructions for executing a distributed file system at a network switch. In the embodiment of FIG. 3, the computing device 300 includes a processor 310 and a machine-readable storage medium 320. The machine-readable storage medium 320 further includes instructions 321 and 323 for executing a distributed file system at the network switch. The computing device 300 may be, for example, a router, a switch, a bridge or any other type of user device capable of executing the instructions 321 and 323. In certain examples, the computing device 300 may be included or be connected to additional components such as a storage drive, a server, etc.

The processor 310 may be, at least one central processing unit (CPU), at least one semiconductor-based microprocessor or other hardware devices suitable for retrieval and execution of instructions stored in the machine-readable storage medium 320, or combinations thereof. The processor 310 may fetch, decode, and execute instructions 321 and 323 to implement for executing a distributed file system at a network switch. As an alternative or in addition to retrieving and executing instructions, the processor 310 may include at least one integrated circuit (IC), other control logic, other electronic circuits, or combinations thereof that include a number of electronic components for performing the functionality of instructions 321 and 323.

The machine-readable storage medium 320 may be any electronic, magnetic, optical, or other physical storage device that contains or stores executable instructions. Thus, the machine-readable storage medium 320 may be, for example, Random Access Memory (RAM), flash (static) memory, an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for executing a distributed file system at a network switch.

Moreover, the instructions 321 and 323 when executed by a processor (e.g., via one processing element or multiple processing elements of the processor) can cause the processor to perform processes, such as, the process of FIG. 4. For example, the execute instructions 321 may be executed by the processor 310 to execute a distributed file system at the network switch, the distributed file system to manage access to a plurality of storage drives (not shown) storing data and connected to the network switch. The communicate instructions 323 may be executed by the processor 310 to communicate with an application server (not shown) connected to the network switch, the distributed file system to control access between the data at the plurality of storage drives and the application server, based on an access request received from the application server at the network switch.

The machine-readable storage medium 320 may also include instructions (not shown) to provide power to at least one of the plurality of storage drives via a port (not shown) of the network switch, the network switch to communicate directly with the at least one storage drive via the port.

FIG. 4 is an example flowchart of a method 400 for running a distributed file system on a network switch. Although execution of the method 400 is described below with reference to the network switch 100, other suitable components for execution of the method 400 can be utilized, such as the network switch 200. Additionally, the components for executing the method 400 may be spread among multiple devices. The method 400 may be implemented in the form of executable instructions stored on a machine-readable storage medium, such as storage medium 320, and/or in the form of electronic circuitry.

At block 410, the network switch 100 runs a distributed file system 122 to manage access to a plurality of storage drives connected to the network switch 100. The plurality of storage drives are to store data, such as user data and file system metadata. Next, at block 420, the network switch 100 allows access to at least one of the plurality of storage drives based on a request received by the distributed file system 122 from an application server to at least one of read from and write to the at least one of the plurality of storage drives. The network switch 100 is to communicate directly with a plurality of storage drives. The application server is to execute a client-side of the distributed file system 122 and the network switch 100 is to execute a server-side of the distributed file system 122.

FIG. 5 is another example flowchart of a method 500 for running a distributed file system on a network switch. Although execution of the method 500 is described below with reference to the network switch 200, other suitable components for execution of the method 500 can be utilized, such as the network switch 100. Additionally, the components for executing the method 500 may be spread among multiple devices. The method 500 may be implemented in the form of executable instructions stored on a machine-readable storage medium, such as storage medium 320, and/or in the form of electronic circuitry.

At block 510, the network switch 200 runs a distributed file system 229 to manage access to a plurality of storage drives 270-1 to 270-n connected to the network switch 200. The plurality of storage drives 270-1 to 270-n are to store data, such as user data and file system metadata. Next, at block 520, the network switch 200 allows access to at least one of the plurality of storage drives 270-1 to 270-n based on a request received by the distributed file system 229 from an application server 260 to at least one of read from and write to the at least one of the plurality of storage drives 270-1 to 270-n.

At block 530, the network switch 200 provides power to at least one of the plurality of storage drives 270-1 to 270-n via a drive interface 230 of the network switch 200. The drive interface 230 is to connect the network switch 200 directly to the at least one storage drive 270-1 to 270-n. The network switch 200 is to communicate directly with the plurality of storage drives 270-1 to 270-n. The application server 260 is to execute a client-side of the distributed file system 229 and the network switch 200 is to execute a server-side of the distributed file system 229.

According to the foregoing, embodiments may provide a method and/or device for running a distributed file system on a network switch. By moving the distributed file system to the network switch and thereby removing a need for an off-board processor and/or a power supply at the storage devices, the smaller storage devices may occupy less space, consume less power, cost less, and generate less heat than traditional file servers, such as commodity servers.

We claim:
1. A network switch, comprising:
a server interface to interface with an application server that is to store an application;
a drive interface to interface with a plurality of storage drives that store data;
a file module to interface with the server interface and the drive interface, the file module including a hypervisor to monitor and manage a plurality of operating systems;
one or more processors; and
a memory resource storing instructions that, when executed by the one or more processors, cause the network switch to:
utilize at least one of the plurality of operating systems to host a distributed file system to manage access to the plurality of storage drives via the server interface, wherein the distributed file system is not included in the plurality of storage drives; and
using the distributed file system, retrieve and update the stored data, and manage available space on the plurality of storage drives.

2. The network switch of claim 1, wherein the executed instructions cause the network switch to communicate directly with the application server and to communicate directly with each of the plurality of storage drives.

3. The network switch of claim 2, wherein the executed instructions further cause the network switch to:
provide power to the plurality of storage drives via the drive interface.

4. The network switch of claim 3, wherein drive interface and each of the plurality of storage drives include Ethernet ports, and wherein the network switch is to provide the power to and communicate with the plurality of storage drives via the Ethernet ports.

5. The network switch of claim 4, wherein the executed instructions cause the network switch is to communicate with the plurality of storage drives via the drive interface using an Advanced Technology Attachment (ATA) over Ethernet (AoE) protocol and is to provide power to the plurality of storage drives via a Power over Ethernet (PoE) controller.

6. The network switch of claim 5, wherein:
the network switch connects directly to each of the plurality of storage drives; and
each of the plurality of storage drives does not include a power supply and does not include an off-board processor.

7. The network switch of claim 1, wherein the application server is to execute a client-side of the distributed file system and the network switch is to execute a server-side of the distributed file system.

8. The network switch of claim 1, wherein the executed instructions further cause the network switch to:
present at least a portion of a single hierarchical name space to the application stored on the application server.

9. A method, comprising:
running, at a network switch, a hypervisor to monitor and manage a plurality of operating systems;
utilizing, by the network switch, at least one of the operating systems to host a distributed file system, to manage access to a plurality of storage drives connected to the network switch, the plurality of storage drives to store data;

accessing, by the network switch, at least one of the plurality of storage drives based on a request, received via the distributed file system from an application server, to at least one of read from or write to the at least one of the plurality of storage drives, the data relating to at least one of user data or file system metadata, wherein the distributed file system is not included in the plurality of storage drives; and using the distributed file system, retrieve and update the stored data, and manage available space on the plurality of storage drives.

10. The method of claim 9, wherein:

the network switch is to communicate directly with the plurality of storage drives; and the application server is to execute a client-side of the distributed file system and the network switch is to execute a server-side of the distributed file system.

11. The method of claim 9, further comprising:

providing power, by the network switch, to at least one of the plurality of storage drives via a drive interface of the network switch, the drive interface to connect the network switch directly to the plurality of storage drives.

12. A non-transitory computer-readable storage medium storing instructions that, when executed by a processor of a network switch, cause the network switch to:

execute a hypervisor to monitor and manage a plurality of operating systems;

utilize at least one of the plurality of operating systems to host a distributed file system to manage access to a plurality of storage drives, the plurality of storage drives storing data and being connected to the network switch;

communicate with an application server connected to the network switch;

utilize the distributed file system to control access between the stored data at the plurality of storage drives and the application server, based on an access request received from the application server at the network switch, wherein the distributed file system is not included in the plurality of storage drives; and using the distributed file system, retrieve and update the stored data, and manage available space on the plurality of storage drives.

13. The non-transitory computer-readable storage medium of claim 12, wherein the executed instructions further cause the network switch to:

provide power to at least one of the plurality of storage drives via a port of the network switch, the network switch to communicate directly with the at least one storage drive via the port.

* * * * *

UNITED STATES PATENT AND TRADEMARK OFFICE
CERTIFICATE OF CORRECTION

| | | |
|---|---|---|
| PATENT NO. | : 9,075,820 B2 | Page 1 of 1 |
| APPLICATION NO. | : 13/562050 | |
| DATED | : July 7, 2015 | |
| INVENTOR(S) | : Bruno Sartirana et al. | |

It is certified that error appears in the above-identified patent and that said Letters Patent is hereby corrected as shown below:

Claims

In column 8, line 44, in Claim 5, delete "is to" and insert -- to --, therefor.

Signed and Sealed this
Ninth Day of February, 2016

Michelle K. Lee
*Director of the United States Patent and Trademark Office*